(12) United States Patent
Yabuta et al.

(10) Patent No.: US 11,285,661 B2
(45) Date of Patent: Mar. 29, 2022

(54) POWDER FOR CERAMIC SHAPING AND CERAMIC SHAPING METHOD USING THE SAME

(71) Applicant: CANON KABUSHIKI KAISHA, Tokyo (JP)

(72) Inventors: Hisato Yabuta, Machida (JP); Nobuhiro Yasui, Yokohama (JP); Kanako Oshima, Tokyo (JP); Akira Tsuboyama, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 498 days.

(21) Appl. No.: 16/178,906

(22) Filed: Nov. 2, 2018

(65) Prior Publication Data

US 2019/0134893 A1   May 9, 2019

(30) Foreign Application Priority Data

Nov. 8, 2017 (JP) .............................. JP2017-215381
Oct. 31, 2018 (JP) .............................. JP2018-206036

(51) Int. Cl.

| | |
|---|---|
| *B29C 64/153* | (2017.01) |
| *B23K 26/32* | (2014.01) |
| *B23K 26/342* | (2014.01) |
| *B23K 26/00* | (2014.01) |
| *B23K 26/14* | (2014.01) |
| *B33Y 10/00* | (2015.01) |
| *B23K 26/144* | (2014.01) |
| *B33Y 70/00* | (2020.01) |
| *B22F 10/20* | (2021.01) |
| *B23K 103/00* | (2006.01) |

(52) U.S. Cl.
CPC ............ *B29C 64/153* (2017.08); *B22F 10/20* (2021.01); *B23K 26/0006* (2013.01); *B23K 26/144* (2015.10); *B23K 26/1476* (2013.01); *B23K 26/32* (2013.01); *B23K 26/342* (2015.10); *B33Y 10/00* (2014.12); *B33Y 70/00* (2014.12); *B23K 2103/52* (2018.08)

(58) Field of Classification Search
CPC ....... B29C 64/10; B29C 64/153; B29C 64/20; B33Y 70/00; B33Y 10/00; B23K 26/32; B23K 26/006; B23K 26/1476
See application file for complete search history.

(56) References Cited

U.S. PATENT DOCUMENTS

| | | | | |
|---|---|---|---|---|
| 2012/0165646 | A1* | 6/2012 | Yamauchi | A61K 49/225 600/407 |
| 2017/0253681 | A1* | 9/2017 | Shen | C08J 3/203 |
| 2017/0298232 | A1* | 10/2017 | Farrugia | C09D 167/02 |

OTHER PUBLICATIONS

Kubota et al., U.S. Appl. No. 16/366,421, filed Mar. 27, 2019.
(Continued)

*Primary Examiner* — Nahida Sultana
(74) *Attorney, Agent, or Firm* — Venable LLP

(57) ABSTRACT

A powder for ceramic shaping to be used for obtaining a structure by repeating the execution of a process of sequential melting and solidification by irradiation of a laser beam contains inorganic compound particles and an organic compound, the organic compound being provided on the surfaces of the inorganic compound particles, and the organic compound has an absorption band that overlaps the wavelength of the laser beam.

11 Claims, 6 Drawing Sheets

(56) References Cited

OTHER PUBLICATIONS

Yves-Christian Hagedorn et al., "Net Shaped High Performance Oxide Ceramic Parts by Selective Laser Melting," 5 Physics Procedia 587-594 (2010).
Yasui et al., U.S. Appl. No. 16/178,884, filed Nov. 2, 2018.
Saburo Nagakura et al. (ed.), Iwanami Dictionary of Physics and Chemistry, 5th Edition, p. 552 (Iwanami Shoten, Publishers; 1998).

* cited by examiner

POWDER FOR CERAMIC SHAPING AND CERAMIC SHAPING METHOD USING THE SAME

BACKGROUND OF THE INVENTION

Field of the Invention

The present invention relates to a powder for ceramic shaping to be used for obtaining a structure by means of a laser beam and also to a ceramic shaping method using such a powder.

Description of the Related Art

In recent years, additive manufacturing technologies (which are also referred to as three-dimensional shaping) that are based on the use of laser beams have been developed and the performances of such technologies have remarkably been raised. Particularly, in the field of metals, manufacturing of minute and diverse shaped objects has been realized by means of selective laser sintering (SLS) techniques or selective laser melting (SLM) techniques, which belong to the genre of powder bed melt bonding method and by which raw material metal powder is sintered or molten and bound together to produce an object having a desired shape by means of laser drawing. Generally, lasers designed to operate in the near infrared region such as YAG lasers and fiber lasers that are compact and low-priced and have high output capabilities are exclusively being employed for these manufacturing techniques.

SLS and SLM are in principle applicable to ceramic materials. However, popular insulating ceramic materials mostly transmit rays of light in a frequency region extending from visible rays to near infrared rays to a large extent. For this reason, laser beams are practically not absorbed at all by ceramic particles that are the raw material when ceramic particles are employed for additive manufacturing by means of an SLS or SLM apparatus. Therefore, a laser beam having considerably high power if compared with the thermal energy required to melt the material to be processed needs to be irradiated to the raw material ceramic particles. Furthermore, if ceramic shaping is attempted by means of melting or sintering and by exploiting the heat generated by the slight absorption of the laser beam, the irradiated laser beam is transmitted and diffused by the ceramic particles so that regions greater than the beam diameter of the irradiated laser beam are molten to make it difficult to carry out micro-precision shaping operations.

In the current situation where the above-identified problems remain undissolved, an additive manufacturing method using a eutectic oxide ceramic material and laser beam irradiation has been proposed in Physics Procedia 5 (2010) 587-594. More specifically, the proposed method uses an $Al_2O_3$—$ZrO_2$ eutectic system for the raw material to lower the melting point of the raw material so as to allow the raw material to be molten with a laser beam of relatively low power. The proponent of the method claims that the method can form microstructures that are peculiar to eutectic systems when the molten material solidifies so that the method can shape ceramic structures having high mechanical strength. While this method improves the degree of manufacturing precision to a certain extent, the products manufactured by the method still gives rise to a large number of protuberances on the surface of the product as well as other problems. In short, this method cannot ensure satisfactorily high precision shaping.

SUMMARY OF THE INVENTION

In an aspect of the present invention, there is provided a powder for ceramic shaping for obtaining a structure by repeating a process of sequential melting and solidification of the powder by irradiation of a laser beam, the powder containing inorganic compound particles and an organic compound, the organic compound being provided on the surfaces of the inorganic compound particles, the organic compound having an absorption band that overlaps the wavelength of the laser beam.

In another aspect of the present invention, there is provided a method of shaping a ceramic structure by using a powder according to the present invention, irradiating a laser beam having a wavelength overlapping the absorption band of the organic compound, the organic compound being a component of the powder, and repeating a process of sequential melting and solidification of the powder.

Further features of the present invention will become apparent from the following description of exemplary embodiments with reference to the attached drawings.

DESCRIPTION OF THE EMBODIMENTS

Figure 1:
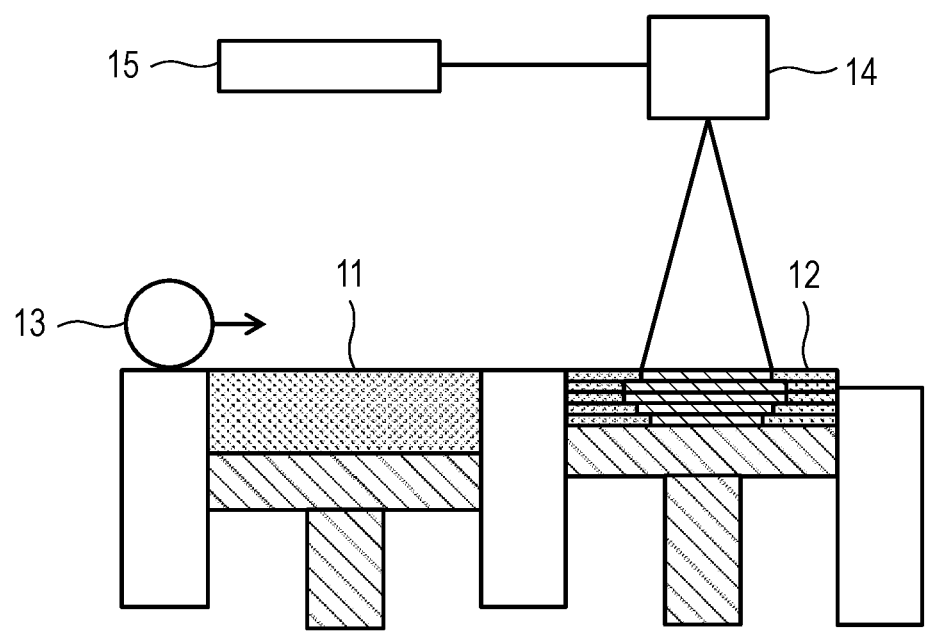
FIG. 1 is a schematic cross-sectional view of an SLS apparatus, schematically illustrating an exemplar shaping technique that is applicable to a powder according to the present invention.

Continuous oscillation solid-state lasers such as YAG lasers and fiber lasers are among popular laser beam sources that are being used for SLS and SLM apparatus and their wavelengths are somewhere near 1,000 nm and found in the near infrared region. While attempts are being made to use pulse oscillation solid-state lasers by some researchers, the wavelengths of such lasers are similar to those of continuous oscillation solid-state lasers. If compact semiconductor lasers are made to show high output power and applied to SLS and SLM apparatus, their wavelengths will presumably be in the visible light region.

When SLS or SLM is employed for ceramic additive manufacturing, the use of $Al_2O_3$ and $ZrO_2$ is suitable because these compounds are less expensive, show high strength and only minimally adversely affect the human body and the environment in addition to the advantage that they show a high sintering performance or a high melt bonding performance. However, these materials do not clearly show the property of absorbing rays of light extending from visible rays of light to near infrared rays. For this reason, these materials inevitably need to be molten or sintered by means of the slight heat that is generated by slight absorption of rays of light irradiated onto them that is caused by the defect levels attributable to the surface structure, the impurities and the vacancies they have so that the use of a high power laser is required for laser beam irradiation for those materials. Since most of the irradiated laser beam is not absorbed by either of the materials but scattered to an area greater than the beam diameter of the irradiated laser beam to consequently produce a shaped object where the boundary of the laser-processed part and the laser-unprocessed part shows distortions. The net result is that the shaped object does not show a desired degree of micro-precision.

With the powder bed melt bonding method (powder laminating method), after the completion of the shaping of a layer, a new layer of unprocessed raw material powder is put on it and a laser drawing operation is executed on the raw material powder. In this way, shaped objects are sequentially laid one on the other to produce a three-dimensional structure. However, the high power laser beam that is irradiated onto the unprocessed raw material powder layer is transmitted through the raw material powder and scattered so as to penetrate into the inside of the processed shaped object and melt, if partly, the shaped object again to consequently give rise to a problem of degrading the micro-precision of the shaped object.

Therefore, to improve the degree of micro-precision of the shaped ceramic object produced by SLS or SLM, it is necessary to raise the efficiency of absorption of the irradiated laser beam by the raw material powder and suppress the transmission of the laser beam through the raw material powder. Additionally, from the viewpoint of further improving the micro-precision of the shaped object, if a complete shaped part is produced by laser beam irradiation and irradiated by another laser beam, no repeated melting should take place in the inside of the part.

The present invention is made to solve the above-identified problems. The present invention provides a raw material powder that can produce micro-precision shaped ceramic objects by means of additive manufacturing of ceramic, using an SLS apparatus or an SLM apparatus. The present invention also provides a method of manufacturing a micro-precision ceramic structure by way of a shaping process using such a powder.

Thus, a high precision ceramic structure can be obtained by way of three-dimensional shaping, using a powder according to the present invention as raw material.

Now, a preferable mode of carrying out the present invention will be described in detail below by referring to the accompanying drawings.

A ceramic shaping technique for obtaining a structure by repeating a process of sequential melting and solidification of the powder located at a laser beam irradiation area according to the present invention will be described by referring to FIGS. 1 and 2. This technique corresponds to SLS or SLM, which are described above. While there are no particular limitations to the wavelength of the laser beam to be used with this technique, a relatively compact and high output power but less expensive laser is generally employed with SLS or SLM.

More specifically, solid-state lasers such as fiber lasers and YAG lasers are being popularly employed as pointed out above and the typical range of oscillation wavelength of popular lasers such as Yb-doped fiber lasers and Nd-doped YAG lasers is between 1,060 nm and 1,080 nm. The range of oscillation wavelength of many solid-state lasers other than the above-listed ones is between 800 nm and 1,200 nm. Besides, high output power semiconductor lasers to be used for processing applications have been developed in recent years and the range of oscillation wavelength of such lasers is mostly between about 700 nm and about 1,000 nm. Any of the above-described lasers can be used for the purpose of the present invention.

Furthermore, with regard to the type of laser oscillation, both continuous oscillation and pulse oscillation can be used for the purpose of the present invention. The diameter of the laser beam to be irradiated for the purpose of the present invention is preferably not less than 10 µm and not more than 200 µm from the viewpoint of obtaining a micro-precision shaped object. Additionally, from the viewpoint of obtaining a large shaped object within a short period of time, the beam diameter of the laser beam to be irradiated is preferably between about 200 µm and about 2,000 µm. In order to achieve such a laser beam diameter, a condenser lens may be used for the purpose of reducing the laser beam diameter at the point of laser beam irradiation.

Now, the selective laser sintering (SLS) technique, which is a type of the powder bed melt bonding method (powder laminating method) or a preferable shaping technique to be used for the purpose of the present invention, will be described below as an exemplar technique by referring to FIG. 1. The SLS technique is also referred to as powder bed direct shaping technique. Shaping apparatus to be used with this shaping technique typically comprise powder cells 11 and shaping stage sections 12, a recoater section 13, a scanner section 14 and a laser 15 among others.

First, powder is manipulated by means of the recoater section 13, while the powder cells 11 and the shaping stage sections 12 are appropriately being moved up and down to spread powder over a region greater than the size of the structure to be produced to a predetermined thickness. Subsequently, a part that corresponds to a cross section of the structure to be produced is drawn on the powder layer with a laser beam by means of the laser 15 and the scanner section 14. Then, as a result, the raw material powder is sintered or molten and solidified. The above-described process is repeated to sequentially lay planar shaped objects that correspond to the respective cross sections one on the other so as to ultimately produce a three-dimensional target structure.

For the purpose of the present invention, the directional energy deposition method (also referred to as cladding technique) can also be employed for shaping in a similar manner. This shaping technique will now be described below by referring to FIG. 2. Powder is driven to jet out from a plurality of powder supply holes 22 arranged in a cladding nozzle 21 and a laser beam 23 is irradiated to the jetted-out powder located in the region where the laser beam is focused to additively produce a structure at a desired position. This technique is characterized in that it can shape a structure on a curved surface.

Now, a powder according to the present invention will be described below.

For the purpose of the present invention, the expression of powder refers to an aggregate of isolated particles. Each of a part or all of the isolated particles comprises particles of an inorganic compound and an organic compound provided on the surfaces thereof.

For the purpose of the present invention, an inorganic compound is an oxide, a nitride, an oxynitride, a carbide or a boride that contains one or more elements belonging to Groups I to XIV of the periodic table except hydrogen and additionally including antimony and bismuth. Each of the inorganic compound particles may be a particle of a single organic compound or a particle of a complex inorganic compound formed by two or more inorganic compounds.

The particles that contain an inorganic compound preferably comprise a metal oxide as principal component. When the particles comprise a metal compound as principal component, a shaped object showing high strength can easily be manufactured by laser irradiation. The expression of a metal oxide as used herein refers to an oxide that contains one or more of the above-listed elements, from which boron, carbon, silicon and germanium are excluded. Above all, a substance that contains aluminum oxide is preferable from the viewpoint of mechanical strength, heat resistance, electrical insulating properties, availability and environmental friendliness among others. A substance that contains zirconium oxide is similarly preferable. Any of such substances may be used alone or, when any of such substances is complexly combined with some substance, the combination can sometimes express a novel feature to make it further preferable.

For example, when the combination of aluminum oxide and zirconium oxide or a combination involving a rare earth metal oxide such as the combination of aluminum oxide and gadolinium oxide or yttrium oxide is used, an eutectic is formed by the metal oxides of such a combination to reduce the melting temperature thereof and hence they can relatively easily be molten by laser irradiation. The combination of gadolinium oxide and zirconium oxide or another rare earth metal oxide such as yttrium oxide, or the combination of aluminum oxide, zirconium oxide and a rare earth metal oxide, can also preferably be used for the same reason. When any of such combinations is used, a eutectic structure appears at the time of re-solidification and such a structure can sometime raise the mechanical strength if compared with an instance where a single metal oxide is used. Besides, when any of the above-listed oxides is combined with a nitride such as aluminum nitride or boron nitride, weight reduction and raised strength can be realized if compared with an instance where only one or more types of metal oxides are used.

It does not matter for the present invention if the inorganic compound particles are crystalline or amorphous. Similarly, it does not matter if the inorganic compound is a single phase compound or a multiphase compound. Furthermore, the inorganic compound particles may include a metal phase and partly contain any of the above-listed nitrides, any of the compounds of the elements of the fifteenth group except antimony compounds and bismuth compounds (which are also referred to as pnictides), any of the compounds of the elements of the sixteenth group except the above-listed oxides (which are also referred to as chalcogenides) and/or any of the compounds of the seventeenth group (which are also referred to as halides). Moreover, the inorganic compound particles may partly contain one or more organic compounds such as a binder for biding micro-particles.

Figure 3:
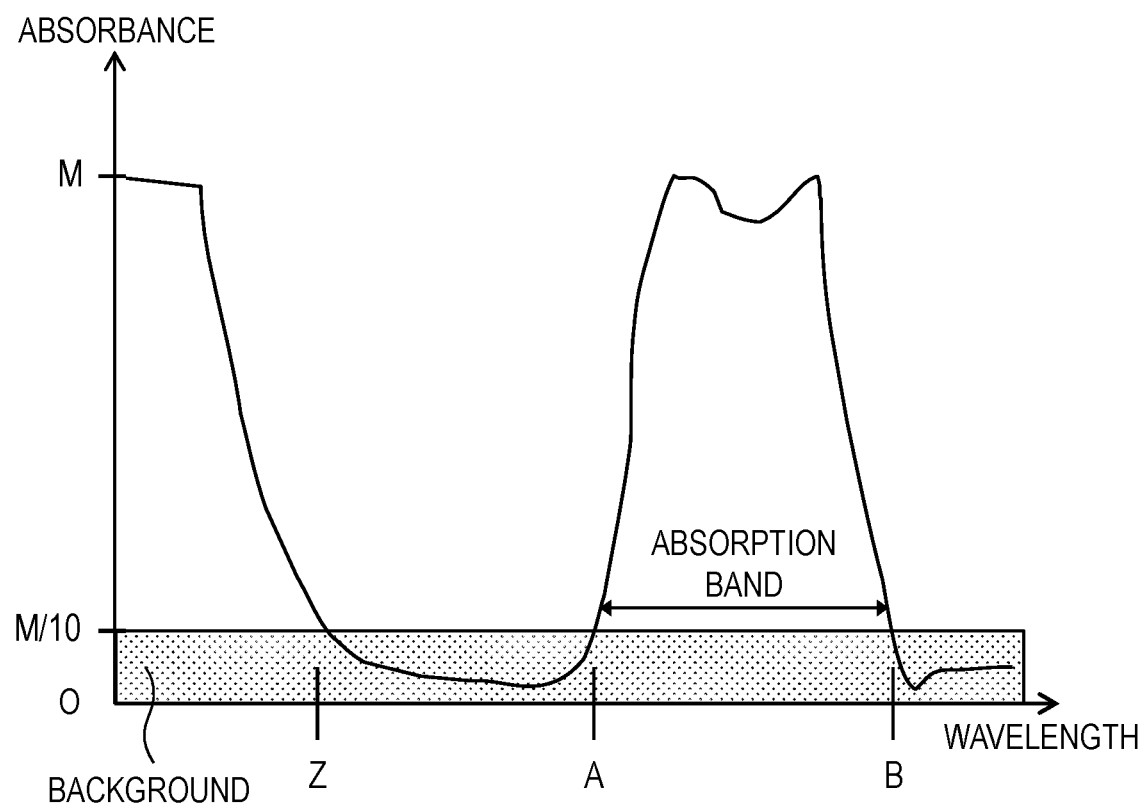
FIG. 3 shows an exemplar light absorption spectrum of a substance.

For the purpose of the present invention, an organic compound is a compound whose principal components are carbon and hydrogen. The organic compound provided on the surfaces of the inorganic compound particles that are to be used for a powder according to the present invention has an absorption band that overlaps the wavelength of the laser beam to be irradiated onto it at the time of shaping. FIG. 3 shows an exemplar light absorption spectrum of a substance. In other words, FIG. 3 is a conceptual illustration of the wavelength dependency of the absorbance of a substance. Each substance absorbs light of a specific wavelength range. In the instance of the absorption spectrum of FIG. 3, one-tenth or less than one-tenth of the maximum absorbance M (namely not more than M/10) is regarded as background and an absorption wavelength range not less than M/10, or the range between wavelength A and wavelength B and the range not greater than wavelength Z are defined as the absorption band. Note that the organic compounds that can be used for the purpose of the present invention do not include any simple carbon atom.

For the purpose of the present invention, an organic compound whose absorption band wavelength range covers the wavelength of the laser beam to be used will be selected as an organic compound provided on the surfaces of the inorganic compound particles.

The absorption band of an organic compound can be found by observing the absorption spectrum of the organic compound by means of a spectrophotometer, in other words by observing the wavelength dependency of the absorbance of the organic compound. The absorption spectrum of an organic compound can be observed by melting the organic compound in a solvent and measuring the wavelength dependency of the absorbance of the solution. While an ordinary spectrophotometer can be used to observe the wavelength range between about 400 nm and about 2,000 nm, a wavelength range covering about 300 nm to about 500 nm below and above a target wavelength, i.e., the wavelength of the laser to be used for the shaping may be selected for the observation of the wavelength dependency of the absorbance.

The organic solvents that can be used to dissolve the organic compound typically include chloroform, methyl ethyl ketone, toluene, acetone, methyl alcohol, ethyl alcohol, isopropyl alcohol and organic acids and one of these organic solvents that do not absorb laser beams within the wavelength range to be used for the observation needs to be selected.

When the organic compound is held in a state of being provided on the surfaces of the inorganic compound particles, the selected organic solvent to dissolve the organic compound is required to neither absorb laser beams within the wavelength range to be used for the observation nor dissolve the inorganic compound particles, for the purpose of observing the absorption spectrum of the organic compound. Otherwise, not only the absorption band of the organic compound but also that of the inorganic compound will be observed to make it difficult to identify the absorption band of the organic compound.

As described above, the laser wavelength that is generally employed for shaping purposes is within the range between 700 nm and 1,200 nm. More particularly, a laser wavelength in the near infrared region of between 1,000 nm and 1,100 nm is popularly employed. Therefore, an organic compound whose absorption band is found within such a wavelength region is preferably used for the purpose of the present invention. Organic compounds that satisfy the above requirement include diimmonium compounds, cyanine compounds, phthalocyanine compounds, naphthalocyanine compounds, squalium compounds, dithiolene metal complex compounds and aminium compounds. Above all, the use of a diimmonium compound or a compound containing cyanine dye as part thereof is preferable from the viewpoint of absorption capacity, chemical stability, availability and price.

Diimmonium compounds typically include salt compounds that are expressed by general formula [1] shown below:

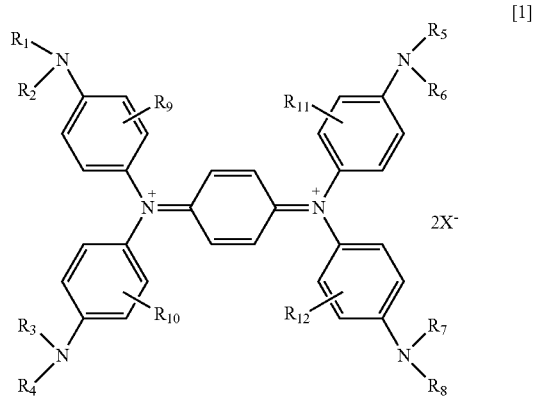

where $X^-$ indicates a negative ion such as $Cl^-$, $Br^-$, $I^-$, $F^-$, $ClO_4^-$, $BF_4^-$, $SbF_6^-$, $CF_3SO_3^-$ or $CH_3C_6H_4SO_3^-$, $R_1$ through $R_8$ may be the same or different from each other, each of them independently representing a hydrogen atom, an alkyl group, an aryl group, an alkenyl group or an alkynyl group and $R_9$ through $R_{12}$ may be the same or different from each other, each of them independently representing a hydrogen atom, a halogen atom, an amino group, a cyano group, a nitro group, a carboxyl group, an alkyl group or an alkoxy group. The compounds can have an absorption band in any of various possible wavelength regions depending on what is selected for each of $X^-$ and $R_1$ through $R_{12}$. In other words, an appropriate compound can be selected by considering the laser wavelength to be used and other factors.

A cyanine dye is a coloring matter (organic compound) having a structure in which two nitrogen-containing heterocycles are bonded by an odd number of methine groups —CH= and one of the two nitrogen atoms forms a tertiary amine structure, while the other one of the two nitrogen atoms forms a quaternary ammonium structure as defined in Iwanami Dictionary of Physics and Chemistry, 5-th edition, p. 552. A cyanine dye is a compound that can have an absorption band in any of various different wavelength regions depending on its molecular structure, the number of methine groups in particular, and hence it is possible to select an appropriate compound depending on the conditions to be considered such as the laser beam wavelength to be used.

Figure 4:
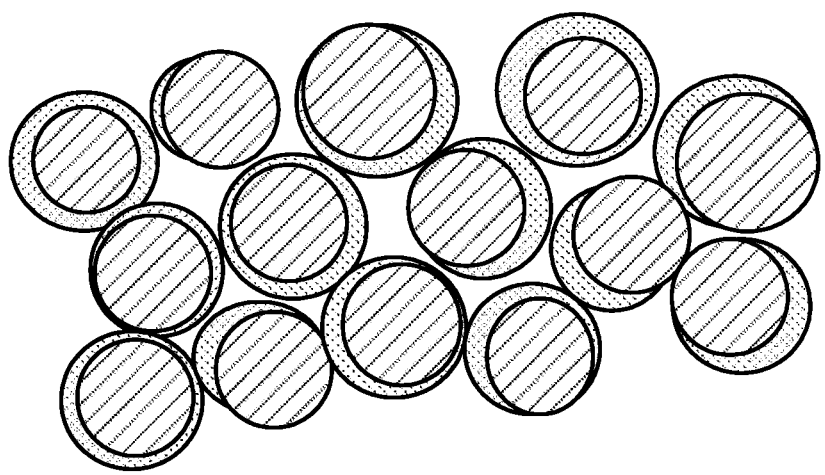
FIG. 4 is a schematic cross-sectional view of a powder according to the present invention, showing a preferable form it can take.

When the organic compound selected from the above-listed ones is provided on the surfaces of the inorganic compound particles, it is preferably made to adhere to many of the inorganic compound particles so as to make it show a high coverage factor. As illustrated in FIG. 4, of the particles contained in the shaping raw material powder, the organic compound adheres to preferably not less than 30%, more preferably not less than 50%, most preferably not less than 90% of the inorganic compound particles. The ratio of the particles of the shaping raw material powder to which the organic compound adheres relative to all the particles can be determined by the method as will be described below. Powder is dispersed within a limited plane, which is then observed through an optical microscope with a magnification that allows a plurality of particles (not less than 50 particles) to be found in the viewing field of the optical microscope through which the powder is to be observed. Then the ratio of the number of the particles to which the organic compound adheres relative to the number of all the particles that are found in the viewing field is determined. The surface area of the particles, to which the organic compound adheres, is covered by the organic compound preferably to not less than 50%, more preferably to not less than 90%, relative to the entire surface area of the particles. From the viewpoint of causing the organic compound to effectively adhere to the surfaces of the particles to such an extent, the organic compound may be dispersed in a polymer compound and the polymer compound and the dispersed organic compound may be made to attach to the surfaces of the inorganic compound particles. With such an arrangement, the organic compound effectively adheres to the inorganic compound particles and then it is possible to make the organic compound cover most or all of the surface area of the inorganic compound particles by optimizing the conditions under which the operation of causing the organic compound to adhere to the inorganic compound particles is executed.

The polymer compound to be used for the above-described purpose is preferably polyvinyl butyral, polyvinyl alcohol, methyl polymethacrylate, polystyrene or the like that excellently adheres to inorganic compounds, metal oxides in particular. The organic compound can be made to attach the surfaces of the inorganic compound particles and satisfactorily cover the surfaces of the particles by melting the organic compound and the polymer compound in the organic solvent simultaneously, mixing the solution and the inorganic compound particles and then volatilizing the solvent of the solution.

When the organic compound is provided on the surfaces of the inorganic compound particles, the wettability and the adhesiveness of the organic compound relative to the surfaces of the inorganic compound particles can be improved to achieve a good coverage by modifying the surfaces of the inorganic compound particles before causing the organic compound to attach the surfaces of the particles. As a technique for modifying the surfaces, for example, a hydrophobing treatment of irradiating ultraviolet rays to the surfaces of the inorganic compound particles may be used. Alternatively, a surface modifying agent such as a silane coupling agent or a phosphonic acid derivative may be applied to the surfaces of the inorganic compound particles. Still alternatively, an immersion treatment may be used as hydrophobing treatment of the surfaces of the inorganic compound particles. The wettability and the adhesiveness of the organic compound relative to the surfaces of the inorganic compound particles are improved and the organic compound can be made to satisfactorily attach the surfaces of the inorganic compound particles to achieve a good coverage by using any of the above-described treatments.

The amount of the organic compound by which it attaches the surfaces of the inorganic compound particles needs to be such that the attached organic compound can transform the irradiated laser beam into an amount of heat that is sufficient for triggering the process of melting the inorganic compound and transferring the heat into the inorganic compound. For this reason, the mass of the organic compound is preferably not less than 0.1% and not more than 10%, more preferably not less than 1% and not more than 10%, most preferably not less than 1% and not more than 5%, of the mass of the inorganic compound powder in average.

Now, the mechanism with which a powder according to the present invention effectively operates in the process of shaping a ceramic structure by means of an additive manufacturing technique using a laser beam will be described below. Note that a shaping process using SLS or SLM will be described below as an example.

Figure 5:
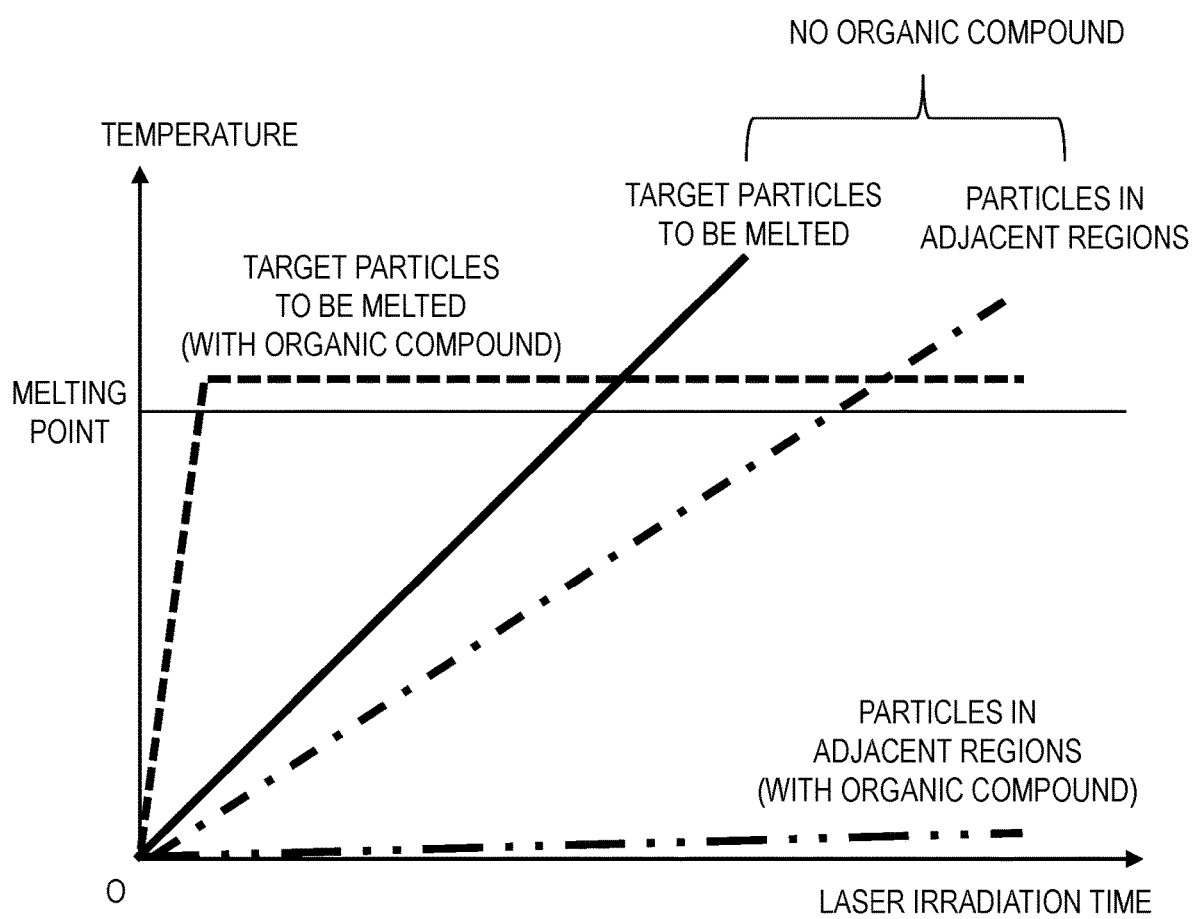
FIG. 5 is a schematic illustration of the behavior of the temperature rise as a function of the laser irradiation time of irradiation of target particles of a powder according to the present invention and having an organic compound attached to the surfaces of thereof, that of target particles of a powder having no organic compound, that of particles of a powder having an organic compound attached to the surfaces thereof and located in adjacent regions and that of particles of a powder having no organic compound and located in adjacent regions.

If inorganic compound particles alone that do not have any absorption band relative to the wavelength of the laser beam to be irradiated are employed as shaping material, the laser beam needs to be irradiated with high power in order to melt the particles because the inorganic compound particles absorb the laser beam only to a small extent. In FIG. 5, the solid line shows the behavior of the temperature rise of the target particles to be molten in terms of the laser irradiation time when a laser beam is irradiated onto them with high power. As shown in FIG. 5, the temperature of the target particles substantially linearly rises relative to the laser irradiation time and the particles melt when the temperature gets to the melting temperature of the particles. At this time, most of the laser beam is transmitted through the target particles and scattered so that the laser beam is damped only to a small extent and gets to regions (particles or a shaped object) typically located adjacent to the already shaped ceramic material. Since the power of the laser beam is damped only to a small extent, the temperature of the regions where the scattered laser beam gets to also rises with the irradiation time and ultimately above the melting point of the ceramic material as indicated by a dot-and-dash line in FIG. 5. Thus, particles that are not the target particles are also molten and/or the shaped object whose particles have once been molten is re-molten in those regions. Then, as a result, the boundary section of the shaped object and hence the boundary of the laser-processed portion and the laser-unprocessed portion becomes distorted to make the attempt for micro-precision shaping unsuccessful.

On the other hand, when the inorganic compound particles that are provided with an organic compound, which has an absorption band at the wavelength of the laser beam, on the surfaces thereof as described above, the organic compound on the surfaces of the particles efficiently absorbs the laser beam and hence the temperature of the particles rises quickly even if the laser beam has only a relatively low power. FIG. 5 shows the temperature change with elapsed time of the particles. The temperature rises quickly within a short period of time from the start of the laser beam irradiation as indicated by a broken line in FIG. 5. The organic compound is decomposed and disappears at a temperature below the melting point of the inorganic compound particles but generates an amount of heat that triggers melting of the inorganic compound particles by the energy of the laser beam that the organic compound has absorbed thus far and imparts the heat to the inorganic compound particles to ultimately melt the inorganic compound. If the laser beam is irradiated further after the decomposition and disappearance of the organic compound, the naked inorganic compound particles generate heat only to a small extent because the power of the irradiated laser beam is low. Therefore, if the heat generation is substantially balanced with the heat emission, the temperature of the inorganic compound particles practically does not rise any further. If the organic compound is made to attach the surfaces of the inorganic compound particles to achieve a satisfactory coverage, the irradiated laser beam is practically not transmitted through the target particles to be molten until the organic compound on the surfaces is decomposed and disappears so that the influence of the laser beam on the particles in adjacent regions is minimized.

As indicated by the two-dot chain line in FIG. 5, the laser beam is transmitted through the target particles after the organic compound is decomposed and disappears so that the scattered beam will get to adjacent regions. However, since the power of the laser beam is held low, the temperature of the adjacent regions rises only slightly by the scattered beam and hence the particles in those regions would not be molten at all. Thus, when a raw material powder according to the present invention is used with the above-described mechanism, melting of only the target particles is triggered and the particles in the adjacent regions that are not target particles are not molten by the scattered beam to make it possible to realize micro-precision laser shaping.

The organic compound that has an absorption band at the wavelength of the laser beam to be irradiated preferably does not contain any metal element. This is because what is desired for the organic compound is that it absorbs the irradiated laser beam to become heated and then totally decomposed and that the decomposition product is totally gasified and disappears (if necessary, by way of a chemical process such as oxidation) so that the inorganic compound that is molten by the heat generated by the organic compound and re-solidified may not contain any residue of the organic compound. Alternatively, the organic compound may contain a metal element if it is gasified and disappears as part of the decomposition product. By using an organic compound having such a characteristic feature and also using inorganic compound particles having a desired composition as raw material powder, a shaped ceramic object of the inorganic compound having a desired composition can be obtained.

As described above, the interaction between the organic compound and the inorganic compound at the time of the melt due to laser beam irradiation is ideally only an exchange of heat and does not involve any chemical reaction, which is an exchange of one or more than one atoms. Therefore the composition of the inorganic compound can be selected regardless of the organic compound to be attached to the inorganic compound.

For the additive manufacturing technology that involves the use of a laser beam, the beam diameter of the laser beam is normally about 100 µm or less. If the particles of the raw material powder to be used at the time of laser beam irradiation include those whose size is greater than the beam diameter of the laser beam, melt takes place only at part of those particles and melt residues arise to consequently produce an irregular shaped object. For this reason, the particle diameter of the powder is preferably smaller than the beam diameter of the laser beam.

Figure 2:
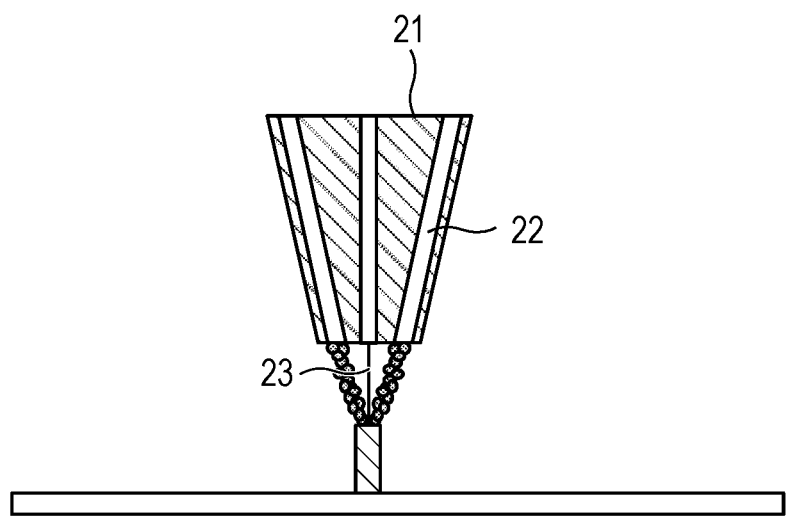
FIG. 2 is a schematic cross-sectional view of a cladding apparatus, schematically illustrating another exemplar shaping technique that is also applicable to a powder according to the present invention.

Additionally, with either SLS as illustrated in FIG. 1 or the cladding technique as illustrated in FIG. 2, the raw material powder is required to show a satisfactory level of fluidity (e.g. 40 seconds/50 g or less). When the fluidity requirement is satisfied and ease of handling is taken into consideration, the average particle diameter of the raw material powder is desirably not less than 5 µm. Thus, the average particle diameter of the raw material powder is desirably not less than 5 µm and not more than 100 µm. For the purpose of the invention, the average particle diameter is determined from a number-basis distribution, which can be obtained by using a light scattering method.

When the fluidity of the raw material powder is taken into consideration, the powder particles desirably show a profile that is close to a perfect sphere, although they are not required to show a perfectly spherical profile so long as they satisfy the required level of fluidity.

EXAMPLES

Trial shaping operations by means of SLS, using a raw material powder according to the present invention and powdery raw materials selected for the purpose of comparison, were executed. The laser with which the SLS apparatus used for the examples was provided was a Yb-doped fiber laser with a maximum output of 100 W and a wavelength of 1,065 nm. The irradiated laser beam was adjusted by adjusting the focus of the converging lens so as to make the laser beam diameter to be equal to 100 μm at the position of the raw material powder where the laser beam is irradiated. For each of the examples and comparative examples, the raw material powder was laid on an alumina ceramic substrate to a thickness of about 100 μm. A laser drawing operation was conducted on the raw material powder by scanning the laser beam by means of a Galvanometer mirror to manufacture a shaped object in each of the examples and the comparative examples. At the time of laser beam irradiation, the power density of the laser beam irradiated onto the powder was so adjusted as to make it show a desired magnitude by adjusting the laser power and the scanning speed.

Example 1 and Example 2

Aluminum oxide ($Al_2O_3$) particles having the average particle diameter of 20 μm were prepared as inorganic compound particles. When the $Al_2O_3$ particles were observed by naked eyes, they appeared white. However, when they were observed through an optical microscope with a magnification of not less than 100, they were transparent.

As organic compound, KAYASORB IRG-069 (trade name, available from Nippon Kayaku), which was a commercially available diimmonium compound having an absorption band in the near infrared region, was brought in. The diimmonium compound was molten in chloroform and the absorption spectrum of the solution was measured by means of a spectrophotometer to find that the absorbance maximum value was observed at the wavelength of 1,190 nm, while the absorbance at the wavelength of 1,065 nm was about nine-tenth of the maximum value at the wavelength of 1,190 nm. From this finding, it was confirmed that the diimmonium compound was a compound that had an absorption band at 1,065 nm, which was the wavelength of the laser beam employed for these examples.

One hundred milligrams of the diimmonium compound was taken by weighing and dissolved in 30 g of chloroform. The solution was then put into a container having a large bottom area and 10 g of the above-described $Al_2O_3$ particles was put into and immersed in the solution. Then, the solution was agitated well to volatilize the chloroform and the solution was dried.

Two hundred particles were taken out of the obtained particles and observed through an optical microscope to find that the brown diimmonium compound had attached to the surfaces of more than a half of the particles by more than a half of the surface area of those particles.

Then, the obtained powder was immersed in chloroform and the substance attached to the surfaces of the particles of the powder was re-molten in the chloroform. Thereafter, the absorption spectrum of the solution was measured to find that the absorbance showed the maximum value at the wavelength of 1,190 nm and the absorbance at the wavelength of 1,065 nm was about nine-tenth of the maximum value. From this finding, it was confirmed that the substance attached to the surfaces of the particles of the powder was a compound that had an absorption band at 1,065 nm, which was the wavelength of the laser beam employed for each of the examples.

This powder was employed as the raw material powder for laser shaping, using a laser having a wavelength of 1,065 nm, to form a 100 μm-thick powder layer and a total of forty 2 mm-long lines were drawn at a pitch of 50 μm by means of a laser beam showing a beam diameter of 100 μm under the conditions listed in Table 1. In other words, the laser beam was irradiated onto an area of 2 mm×2 mm. Two objects were shaped in the above-described manner and respectively used in Example 1 and Example 2 as the (flat) shaped objects of these examples.

Example 3

Zirconium oxide ($ZrO_2$) particles having the average particle diameter of 30 μm were prepared as inorganic compound particles in addition to aluminum oxide ($Al_2O_3$) particles having the average particle diameter of 20 μm. These two oxides were employed as inorganic compound particles. When the $ZrO_2$ particles were observed by naked eyes, they appeared white. However, when they were observed through an optical microscope with a magnification of not less than 100, they were transparent. $Al_2O_3$ particles and $ZrO_2$ particles were mixed with each other to a mass ratio of 6 to 4.

KAYASORB IRG-069 (trade name, available from Nippon Kayaku) was employed as organic compound as in Example 1. One hundred mg of the diimmonium compound was taken by weighing and dissolved in 30 g of chloroform. The solution was then put into a container having a large bottom area and 10 g of the above-described $Al_2O_3$—$ZrO_2$ mixture particles were put into and immersed in the solution. Then, the solution was agitated well to volatilize the chloroform and the solution was dried.

Two hundred particles were taken out of the obtained particles and observed through an optical microscope to find that the brown diimmonium compound had attached to the surfaces of more than a half of the particles by more than a half of the surface area of those particles. The obtained powder was used as raw material powder for laser shaping and a laser beam was irradiated onto it under the conditions listed in Table 1 to obtain the shaped object of Example 3 as in Example 1.

Example 4 and Example 5

Aluminum oxide ($Al_2O_3$) particles having the average particle diameter of 20 μm similar to those used in Example 1 and Example 2 were prepared as inorganic compound particles. As organic compound, 2-[(1E)-3-[(1E)-5,5-dimethyl-3-[(1E)-3-[(2E)-1,3,3-trimethyl-2,3-dihydro-1H-indol-2-ylidene]prop-1-en-1-yl]cyclohex-2-en-1-ylidene]prop-1-en-1-yl]-1,3,3-trimethyl-3H-indol-1-ium; trifluoro[(trifluoromethanesulfonylazanidyl)sulfonyl]methane, which is a cyanine dye, (composition formula $C_{38}H_{43}F_6N_3O_4S_2$, S09441: trade name, available from Spectro Info) was brought in.

The compound was dissolved in chloroform and the absorption spectrum of the solution was measured by means of a spectrophotometer to find that the absorbance maximum value was observed at the wavelength of 870 nm, while the absorbance at the wavelength of 1,065 nm was about onefifth of the maximum value at the wavelength of 870 nm. From this finding, it was confirmed that the cyanine dye was a compound that had an absorption band at 1,065 nm, which was the wavelength of the laser beam employed for these examples.

One hundred milligrams of the cyanine dye was taken by weighing and dissolved in 30 g of chloroform. The solution was then put into a container having a large bottom area and 10 g of the above-described $Al_2O_3$ was put into and immersed in the solution. Then, the solution was agitated well to volatilize the chloroform and the solution was dried. About 200 particles were taken out of the obtained particles and observed through an optical microscope to find that the green cyanine dye had attached to the surfaces of more than a half of the particles by more than a half of the surface area of those particles. The obtained powder was used as raw material powder for laser shaping and a laser beam was irradiated onto it under the conditions listed in Table 1, while varying the laser power and the laser scanning speed, to obtain the shaped objects of Example 4 and Example 5 as in Example 1 and Example 2.

Example 6

Aluminum oxide ($Al_2O_3$) particles having the average particle diameter of 20 μm, which were similar to those used in Example 1 and Example 2, were prepared as inorganic compound particles. As organic compound, the cyanine dye same as the one used in Example 4 and Example 5 (S09441: trade name, available from Spectro Info) was brought in. One hundred mg of the cyanine dye was taken by weighing and dissolved in 30 g of chloroform. Then, 300 mg of polyvinyl butyral (PVB) was put into the solution and dissolved. The solution was then put into a container having a large bottom area and 10 g of the above-described $Al_2O_3$ particles was put into and immersed in the solution. Then, the solution was agitated well to volatilize the chloroform and the solution was dried. Two hundred particles taken out of the obtained particles were observed through an optical microscope to find that the green cyanine dye had attached to the surfaces of more than a half of the particles by more than a half of the surface area. The obtained powder was used as raw material powder for laser shaping and a laser beam was irradiated onto it under the conditions listed in Table 1 to obtain the shaped object of Example 6 as in Example 1 and Example 2.

Comparative Example 1 and Comparative Example 2

Aluminum oxide ($Al_2O_3$) particles having the average particle diameter of 20 μm, which were similar to those used in Example 1 and Example 2, were prepared as inorganic compound particles. The $Al_2O_3$ particles were used as raw material powder for laser shaping without having any organic compound attached to them and the shaped objects of Comparative Example 1 and Comparative Example 2 were formed as in Example 1 and Example 2 by irradiating a laser beam onto the raw material powder under the conditions listed in Table 1.

Comparative Example 3

Aluminum oxide ($Al_2O_3$) particles having the average particle diameter of 20 μm and Zirconium oxide ($ZrO_2$) particles having the average particle diameter of 30 μm similar to those used in Example 3 were prepared. Aluminum oxide ($Al_2O_3$) particles and Zirconium oxide ($ZrO_2$) particles were mixed to a mass mixture ratio of 6 to 4. As in Example 3, the $Al_2O_3$—$ZrO_2$ mixture particles were used as raw material powder for laser shaping without having any organic compound attached to them and a laser beam was irradiated onto them under the conditions listed in Table 1 to obtain the shaped object of Comparative Example 3.

Table 1 shows the type of powder, the shaping conditions and the obtained result of each of Examples 1 through 6 and Comparative Examples 1 through 3.

[Evaluation of Contour Runout Width of Boundary Section]

Figure 6:
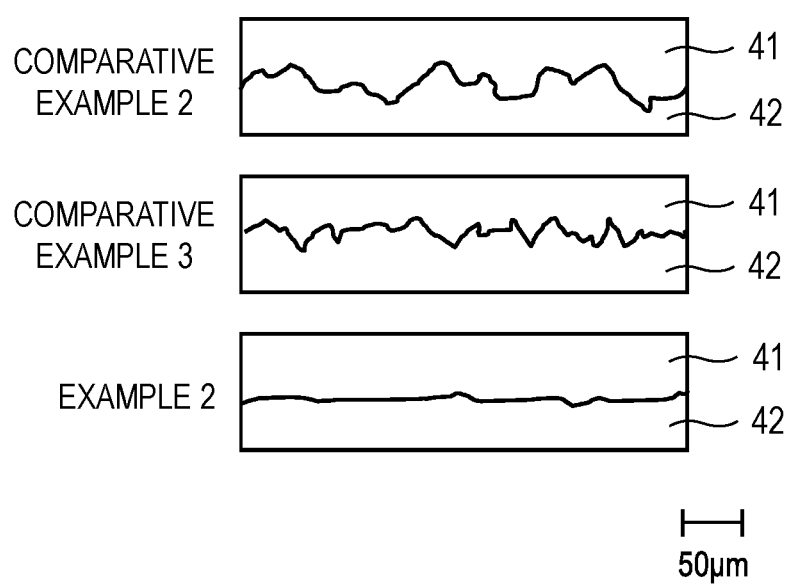
FIG. 6 is a schematic illustration of the swinging width of the boundary of a laser irradiation region and a laser non-irradiation region as observed in an example and in each of two comparative examples.

As index of micro-precision of shaped object, a 100 μm wide image (as viewed in the direction perpendicular to the direction of laser irradiation) was cut from a photomicrograph of the boundary of the laser-irradiated portion 42 and the laser-unirradiated portion 41 of each of the shaped objects of the examples and the comparative examples as shown in FIG. 6 and the maximum value of the contour runout width of the boundary section was evaluated. A small contour runout width proves a micro-precision drawing. As seen from FIG. 6, in Example 2 where raw material powder according to the present invention was used, a micro-precision shaped object showing a very small contour runout width was obtained unlike in Comparative Example 2 and Comparative Example 3.

In addition to the contour runout width, the profile unevenness and the processing unevenness and other factor of the shaped object were taken into consideration in a comprehensive manner to evaluate the make of each of the shaped objects. A 4-step rating system of A, B, C and D, where A is the highest rating and so on, was used for the evaluation. The results are shown in Table 1. More specifically, each of the shaped objects was evaluated from the viewpoint of satisfying or not satisfying three requirements including that the contour runout width is not greater than 20 μm when observed through an optical microscope, that the height of the surface unevenness of the shaped part is not greater than a half of the average particle diameter of the unprocessed raw material powder particles and that the laser-irradiated portion does not include any part showing the profiles of the remaining raw material powder particles that adversely affect the shaping process. Level A was given to a sample that satisfied all of the three requirements and B was given to a sample that satisfied two of the three requirements, while C was given to a sample that satisfied only one of the three requirements and D was given to a sample that did not satisfy any of the three requirements.

A laminated shaped object that does not satisfy any of these requirements not only shows an adversely affected appearance due to the degraded precision but also can give rise to a fall of mechanical strength. In other words, a shaped object preferably satisfies not less than two of the three requirements and more preferably all the three requirements.

TABLE 1

| | Raw material powder shaping | | | Shaping conditions | | | Result of shaping | |
| --- | --- | --- | --- | --- | --- | --- | --- | --- |
| | | | | | | | Contour | |
| | Inorganic compound particles | Organic compound | Polymer compound | Laser power (W) | Scanning speed (mm/s) | Energy density (J/mm2) | runout width (μm) | Judgment |
| Ex 1 | $Al_2O_3$ | IRG-069 | None | 30 | 200 | 1.5 | 11.2 | B |
| Ex 2 | $Al_2O_3$ | IRG-069 | None | 10 | 50 | 2.0 | 8.6 | A |
| Ex 3 | $Al2O3 + ZrO_2$ | IRG-069 | None | 30 | 200 | 1.5 | 9.5 | A |
| Ex 4 | $Al_2O_3$ | S09441 | None | 30 | 200 | 1.5 | 12.8 | B |
| Ex 5 | $Al_2O_3$ | S09441 | None | 10 | 50 | 2.0 | 9.2 | A |
| Ex 6 | $Al_2O_3$ | S09441 | PVB | 10 | 50 | 2.0 | 7.5 | A |
| Comp Ex 1 | $Al_2O_3$ | None | None | 30 | 100 | 3.0 | 48.0 | D |
| Comp Ex 2 | $Al_2O_3$ | None | None | 30 | 50 | 6.0 | 40.0 | D |
| Comp Ex 3 | $Al_2O_3 + ZrO_2$ | None | None | 30 | 100 | 3.0 | 28.5 | C |

The shaped object of Example 1 was slightly dark colored but it will be safe to say that the coloring was not attributable to the organic compound but attributable to oxygen deficiency caused by laser heating. The contour runout width of the shaped object was about 11 μm and the shaped object showed the profiles of the remaining raw material powder particles only to an extent that did not adversely affect the shaping. Additionally, the degree of surface unevenness was low. Thus, as a result, a shaped object that showed a clear and flat boundary was obtained.

In Example 2, the laser power was reduced and the scanning speed was lowered from their respective counterparts of Example 1. The shaped object of Example 2 was not colored but transparent. The contour runout width was not more than 10 The shaped object barely showed surface unevenness and did not show any profiles of remaining raw material powder particles. Thus, as a result, a shaped object that showed a clearer and flatter boundary, if compared with Example 1, was obtained.

In Example 3, a shaped object was formed by using mixture particles of $Al_2O_3$ and $ZrO_2$ under conditions similar to those of Example 1. The shaped object of this example was slightly dark colored just like the shaped object of Example 1. Again, it will be safe to say that the coloring was not attributable to the organic compound but attributable to oxygen deficiency caused by laser heating. The contour runout width of the shaped object was not more than 10 μm. The shaped object barely showed surface unevenness and did not show any profiles of remaining raw material powder particles. This may be because, as a mixture of $Al_2O_3$ and $ZrO_2$ was used, the mixture particles started melting at the eutectic temperature of $Al_2O_3$ and $ZrO_2$. In other words, the mixture particles started melting at a temperature lower than the melting temperature of $Al_2O_3$ in Example 1. Thus, as a result, a shaped object that showed a clear and flat boundary was obtained.

Example 4 and Example 5 correspond respectively to Example 1 and Example 2. However, the diimmonium compound (IRG-069) in Example 1 and Example 2 was replaced by a cyanine dye (S09441) in Example 4 and in Example 5. In other words, the shaped objects of Example 4 and Example 5 were respectively the same as those of Example 1 and Example 2 except a different organic compound was used in Example 4 and Example 5. The net result was that the shaped objects of Example 4 and Example 5 showed a clear and flat boundary just like the shaped objects of Example 1 and Example 2.

The shaped object of Example 6 was produced under the conditions that were the same as those of Example 5 but the organic compound was dispersed in a polymer compound before the organic compound was made to attach the inorganic compound to improve the surface coverage of the organic compound on the inorganic compound of Example 5. The shaped object of Example 6 showed a contour runout width that was narrower than the contour runout width of the shaped object of Example 5 because of the high surface coverage of Example 6. As in Example 5, the shaped object did not show any profiles of remaining raw material powder particles and barely showed surface unevenness. Thus, as a result, a shaped object that showed a clear and flat boundary was obtained.

In each of Comparative Example 1 and Comparative Example 2, a shaped object was formed by using $Al_2O_3$ particles to which no organic compound was attached. As a preliminary study, such $Al_2O_3$ particles were used to produce a shaped object under the shaping conditions same as those of Example 1 (in terms of energy density adjustment by means of laser power and laser scanning speed) to find that the $Al_2O_3$ particles practically did not melt and molten $Al_2O_3$ particles appeared only at a small part of the entire particles. It may be safe to say that this was because the $Al_2O_3$ particles practically did not absorb the irradiated laser beam and hence a sufficient amount of heat that was necessary for melting the $Al_2O_3$ particles was not generated. In other words, the small amount of generated heat was due to absorption of the laser beam that was probably attributable to sporadically found flaws and impurities.

By seeing the above-described result, the shaping conditions that can melt most of the $Al_2O_3$ particles that were free from any attaching organic compound by laser beam irradiation were looked for to find that the $Al_2O_3$ particles would melt under shaping conditions that involve the use of energy density that was twice as high as the energy density employed in Example 1.

Laser shaping was tried in Comparative Example 1 as in Example 1 under the above conditions to obtain a dark colored shaped object that was probably attributable to oxygen deficiency as in Example 1. Note, however, that the contour runout width showed a large value of about 50 μm. It may be safe to say that this was because the $Al_2O_3$ particles that were free from any attaching organic compound, which is a powdery raw material, practically did not absorb the laser beam irradiated onto them and the scarcely damped scattered laser beam melted the unprocessed particles located around the irradiation spot. On the other hand, melting occurred unevenly although the energy density of the laser beam was high and unmolten particles were found here and there. The surface unevenness was remarkable probably because of the uneven melting and the profiles of remaining raw material powder particles were observed here and there. Thus, the obtained shaped object was unsatisfactory because it lacked micro-precision and showed processing unevenness to a large extent.

In Comparative Example 2, $Al_2O_3$ particles that were free from any attaching organic compound were used as shaping raw material powder as in Comparative Example 1 and the shaping operation was executed under conditions involving the use of energy density of the laser beam that was twice of that of Comparative Example 1 to avoid any unmolten particles. As a result, a dark colored shaped object was obtained as in Comparative Example 1. However, while the contour runout width was slightly improved, it was about 40 which was still a large value. Since the energy density of the laser beam was high, the particles were molten sufficiently. Similarly, since the amount of unmolten particles was small, the obtained shaped object showed a smooth surface. However, uneven melting was noticeable and hence unmolten particles were found, if slightly. Additionally, the profiles of remaining raw material powder particles were observed and surface unevenness that was attributable to those particles was also noticeable. Thus, the obtained shaped object was unsatisfactory because it lacked micro-precision and showed processing unevenness to a large extent.

In Comparative Example 3, mixture particles of $Al_2O_3$—$ZrO_2$ that show a melting temperature lower than $Al_2O_3$ particles were employed as raw material shaping powder without causing an organic compound to attach them and a laser shaping operation was executed on them under the shaping conditions same as those of Comparative Example 1. Because of the lowered melting temperature, a shaped object showing a smoother and less uneven surface was produced if compared with the shaped object of Comparative Example 1. The contour runout width was also improved but still showed a width of about 30 μm which was a relatively large value. Additionally, the profiles of remaining raw material powder particles were observed, if slightly. Thus, although the obtained shaped object revealed a certain degree of improvement, it was still unsatisfactory because it lacked micro-precision and showed processing unevenness to a large extent.

Example 7

While shaped objects having a single layer were described above, a laminated shaped object will be described below.

A ceramic structure was manufactured by irradiating a laser beam onto a powder for ceramic shaping and repeating a process of melting and solidifying the powder by means of an SLS apparatus as shown in FIG. 1. The employed raw material powder included aluminum oxide ($Al_2O_3$) particles having the average particle diameter of 20 μm that also was employed in Example 1 and Example 2 and KAYASORB IRG-069 (trade name, available from Nippon Kayaku), which was a commercially available diimmonium compound. The manufacturing process same as the one used in Example 1 was also employed in this example. The shaping conditions including the laser power and the laser scanning speed were the same as those of Example 2.

First, the above-described raw material powder was filled in powder cells as illustrated in FIG. 1 and the powder was laid on an alumina substrate arranged on the shaping stage 12 to a thickness of 20 μm by means of the recoater section 13. The wavelength of the laser beam emitted from the laser 15 was 1,065 nm and the laser beam diameter on the powder surface was adjusted to 100 μm by adjusting the focus and other factors. A 20 mm×20 mm large flat single layered shaped object was obtained by scanning the laser beam by means of the scanner section 14 and drawing four hundred 20 nm-long straight lines at a pitch of 50 μm. Then, the raw material powder filled in the powder cells 11 was laid on the above flat single layered shaped object to a thickness of 20 nm by means of the recoater section 13, adjusting the height of the shaping stage 12. Thus, a laminated shaped object was obtained by executing a similar laser drawing operation on the powder. The laminate-shaping process was repeated for 400 times to obtain a laminated shaped object, where 400 layers of shaped objects were laid and bound together.

[Evaluation of Contour Runout Width of Boundary Section]

As index of micro-precision of shaped object, just like the examples shown in FIG. 6, a 100 μm-wide image was cut from a photomicrograph of the boundary of the laser-irradiated portion 42 and the laser-unirradiated portion 41 of the top layer of the laminated shaped object of Example 7 and also from a photomicrograph of the boundary of the laser-irradiated portion 42 and the laser-unirradiated portion 41 of the top layer of the laminated shaped object of Comparative Example 4, which will be described hereinafter, and the contour runout width of the boundary was evaluated for each of Example 7 and Comparative Example 4. A small contour runout width proves a micro-precision drawing. In addition to the contour runout width, the profile unevenness and the processing unevenness and other factor of the shaped object were taken into consideration in a comprehensive manner to evaluate the make of each of the laminated shaped objects. A 4-step rating system of A, B, C and D, where A is the highest rating and so on, was used for the evaluation. More specifically, each of the laminated shaped objects was evaluated from the viewpoint of satisfying or not satisfying three requirements including that the contour runout width is not greater than 20 μm when observed through an optical microscope, that the height of the surface unevenness of the shaped part is not greater than a half of the average particle diameter of the unprocessed raw material powder particles and that the laser-irradiated portion does not include any part showing the profiles of the remaining raw material powder particles that adversely affect the shaping process. Level A was given to a sample that satisfied all of the three requirements and B was given to a sample that satisfied two of the three requirements, while C was given to a sample that satisfied only one of the three requirements and D was given to a sample that did not satisfy any of the three requirements.

A laminated shaped object that does not satisfy any of these three requirements not only shows an adversely affected appearance due to the degraded micro-precision but also can give rise to a fall of mechanical strength. In other words, a laminated shaped object preferably satisfies not less than two of the three requirements and more preferably all the three requirements.

The obtained laminated shaped object of Example 7 showed a thickness of about 4 mm. Thus, it was found that the thickness of each of the flat shaped objects had been reduced to a half of its original thickness that was observed when the raw material powder was laid because of the melting of the powder. Table 2 shows the type of the raw material powder, the shaping conditions and the result of melting and the profiles of remaining raw material powder particles were observed here and there. Thus, the obtained laminated shaped object was unsatisfactory because it lacked micro-precision and showed processing unevenness to a large extent.

TABLE 2

| | Raw material powder | | | Shaping conditions | | | Result of shaping | | |
|---|---|---|---|---|---|---|---|---|---|
| | Inorganic compound particles | Organic compound | Polymer compound | Laser power (W) | Scanning speed (mm/s) | Energy density (J/mm2) | Shaped object thickness (mm) | Contour runout width (μm) | Judgment |
| Ex 7 | $Al_2O_3$ | IRG-069 | None | 10 | 50 | 2.0 | 4.0 | 9.8 | A |
| Comp Ex 4 | $Al_2O_3$ | None | None | 30 | 50 | 6.0 | 4.4 | 55.0 | D | shaping of this example. It was found that the laminated shaped object showed a degree of micro-precision comparable to that of the shaped object of Example 2, although the contour runout width of the top layer of the laminated shaped object of this example was slightly greater than the comparable width of the flat single layered shaped object of Example 2. The surface of the top layer of the laminated shaped object was satisfactorily smooth and did not show any profiles of remaining raw material powder particles, although the surface unevenness of the top layer was slightly more remarkable than that of the flat single layered shaped object of Example 2. Thus, as a result, a high micro-precision shaped object that showed a clear boundary, a smooth surface and an excellent processing uniformity was obtained.

Comparative Example 4

A ceramic structure was manufactured by using aluminum oxide ($Al_2O_3$) particles having the average diameter of 20 μm that were free from any attached organic compound and similar to those used in Comparative Example 1 and Comparative Example 2 as raw material powder for shaping and also using an SLS apparatus and a laminated object shaping process same as those used in Example 7. The shaping conditions including the laser power and the laser scanning speed were the same as those of Comparative Example 2. Additionally, the laminating step and the laminating conditions were the same as those of Example 7.

The obtained laminated shaped object showed a thickness of little more than 4 mm. Thus, it was found that the thickness of each of the flat shaped objects had been reduced to a half of its original thickness that was observed when the raw material powder was laid because of the melting of the powder but the overall thickness was slightly greater than the laminated shaped object of Example 7, where an organic compound was attached to the raw material powder. Table 2 also shows the type of the raw material powder, the shaping conditions and the result of shaping of this comparative example.

The contour runout width of the top layer of the laminated shaped object was as large as that of the flat single layered shaped object of Comparative Example 2 and consequently it was found that the obtained shaped object remarkably lacked micro-precision. The surface unevenness of the top layer was more remarkable than that of the flat single layered shaped object of Comparative Example 2 and hence the surface was highly irregular. Additionally, uneven laser Example 8 Through 10

Aluminum oxide ($Al_2O_3$) particles having the average particle diameter of 20 μm were prepared as inorganic compound particles as in Example 1. As organic compound, KAYASORB IRG-069 (trade name, available from Nippon Kayaku), was used also as in Example 1. 10 mg, 500 mg and 1,000 mg of this diimmonium compound were weighed and each of them was dissolved in 30 g of chloroform. Each of these solutions was then put into a container having a large bottom area and 10 g of the above-described $Al_2O_3$ was put into and immersed in the solution. Then, each of the solutions was agitated well to volatilize the chloroform and the solution was dried. While the mass ratio of the raw material powder of the inorganic compound to the organic compound of Example 1 (to be referred to as organic/inorganic mass ratio hereinafter) was 1 mass %, the prepared raw material powder of Example 8, that of Example 9 and that of Example 10 that respectively showed organic/inorganic mass ratios of 0.1 mass %, 5 mass % and 10 mass % were prepared.

For each of Examples 8 through 10, about 200 particles of the obtained powder particles were observed through an optical microscope to find that the brown diimmonium compound had attached to the surfaces of more than a half of the particles by more than a half of the surface area of these particles. The raw material powder was used as the raw material for laser shaping for each of Examples 8 through 10 and the shaped objects of Examples 8 through 10 were formed by using the respective raw materials under conditions that were similar to those of Example 1 including the conditions of laser irradiation. Table 3 shows the powder employed for preparing the shaped object, the shaping conditions and the obtained result of each of Examples 8 through 10.

[Evaluation of Contour Runout Width of Boundary Section]

An evaluation session was executed as in Example 1. More specifically, as index of micro-precision of each of the obtained shaped objects, a 100 μm wide image was cut from a photomicrograph of the boundary of the laser-irradiated portion 42 and the laser-unirradiated portion 41 of the top layer of the shaped object of each of the examples as shown in FIG. 6 and the contour runout width of the boundary section was evaluated. A small contour runout width proves a micro-precision drawing. In addition to the contour runout width, the profile unevenness and the processing unevenness and other factor of the shaped object were taken into consideration in a comprehensive manner to evaluate the make of each of the shaped objects. A 4-step rating system of A, B, C and D, where A is the highest rating and so on, was used for the evaluation. More specifically, each of the shaped objects was evaluated from the viewpoint of satisfying or not satisfying three requirements including that the contour runout width is not greater than 20 μm when observed through an optical microscope, that the height of the surface unevenness of the shaped part is not greater than a half of the average particle diameter of the unprocessed raw material powder particles and that the laser-irradiated portion does not include any part showing the profiles of the remaining raw material powder particles that adversely affect the shaping process. A was given to a sample that satisfied all of the three requirements and B was given to a sample that satisfied two of the three requirements, while C was given to a sample that satisfied only one of the three requirements and D was given to a sample that did not satisfy any of the three requirements. A shaped object that does not satisfy any of these requirements not only shows an adversely affected appearance due to the degraded precision but also can give rise to a fall of mechanical strength. In other words, a shaped object preferably satisfies not less than two of the three requirements and more preferably all the three requirements.

preferably by not less than 0.1 mass % and not more than 10 mass %, more preferably by not less than 1 mass % and not more than 10 mass % of the inorganic compound. However, since diimmonium compounds and cyanine dyes that are suitable as organic compound to be attached to inorganic compound particles are very expensive, the organic compound is contained most preferably by not less than 1 mass % and not more than 5 mass % of the inorganic compound when the cost of the material is taken into consideration.

Micro-precision ceramic shaped objects can be obtained by way of three-dimensional shaping and by using a powder for ceramic shaping according to the present invention. Thus, a powder for ceramic shaping according to the present invention can advantageously be utilized in the field of ceramic parts that are required to show a complex profile.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-215381, filed Nov. 8, 2017 and Japanese Patent Application No. 2018-206036, filed Oct. 31, 2018, which are hereby incorporated by reference herein in their entirety.

TABLE 3

| | Raw material powder | | | | Shaping conditions | | | Result of shaping | |
|---|---|---|---|---|---|---|---|---|---|
| | Inorganic compound particles | Organic compound | Organic/inorganic mass ratio | Polymer compound | Laser power (W) | Scanning speed (mm/s) | Energy density (J/mm2) | Contour runout width (μm) | Judgment |
| Ex 8 | Al$_2$O$_3$ | IRG-069 | 0.1 mass % | None | 30 | 200 | 1.5 | 17.3 | B |
| Ex 9 | Al$_2$O$_3$ | IRG-069 | 5 mass % | None | 30 | 200 | 1.5 | 9.6 | A |
| Ex 10 | Al$_2$O$_3$ | IRG-069 | 10 mass % | None | 30 | 200 | 1.5 | 9.1 | A |

The shaped object of Example 8 was slightly dark colored but it will be safe to say that the coloring was not attributable to the organic compound but attributable to oxygen deficiency caused by laser heating. The contour runout width of the shaped object was about 17 μm and the shaped object showed the profiles of the remaining raw material powder particles only to a small extent that could adversely affect the appearance or the strength of the shaped object, although the surface unevenness was smaller than a half of the average particle diameter of the unprocessed raw material powder particles. Thus, as a result, a shaped object that showed a clear and flat boundary was obtained.

The shaped object of each of Examples 9 and 10 was slightly dark colored as in Example 1 and Example 8 but it will be safe to say that the coloring was not attributable to the organic compound but attributable to oxygen deficiency caused by laser heating. The contour runout width was somewhere between 9 μm and 10 μm for each of the shaped objects of these examples. Surface unevenness was practically not observed and no profiles of the remaining raw material powder particles were observed. This may be because the organic/inorganic mass ratio was large and hence the organic compound evenly absorbed the laser beam to in turn evenly melt the inorganic compound particles. Thus, as a result, a shaped object that showed a clear and flat boundary was obtained for each of the examples.

When Example 1 and Examples 8 through 10 are compared, it will be seen that the organic compound is contained

What is claimed is:

1. A powder for ceramic shaping for obtaining a structure by repeating a process of sequential melting and solidification of the powder by irradiation of a laser beam, the powder comprising:
   inorganic compound particles; and
   an organic compound provided on surfaces of the inorganic compound particles,
   wherein the organic compound has an absorption band that overlaps a wavelength of the laser beam,
   wherein the inorganic compound particles include at least two different types of particles containing different inorganic compounds, where each particle contains a single inorganic compound, or the inorganic compound particles include particles containing at least two different inorganic compounds in a single particle, and
   wherein the inorganic compound particles contain a combination of inorganic compounds, which form a eutectic system.

2. The powder for ceramic shaping according to claim 1, wherein the inorganic compound particles contain a metal oxide as principal component thereof.

3. The powder for ceramic shaping according to claim 2, wherein the powder contains aluminum oxide and zirconium oxide.

4. The powder for ceramic shaping according to claim 2, wherein the powder contains aluminum oxide and a rare earth metal oxide.

5. The powder for ceramic shaping according to claim 1, wherein the wavelength of the laser beam is within the range between 700 nm and 1,200 nm.

6. The powder for ceramic shaping according to claim 1, wherein a content of the organic compound is 0.1 mass % to 10 mass % of the inorganic compound particles.

7. The powder for ceramic shaping according to claim 1, wherein the organic compound contains a diimmonium compound or a cyanine dye.

8. The powder for ceramic shaping according to claim 1, wherein the organic compound provided on the surfaces of the inorganic compound particles is dispersed in a polymer compound.

9. The powder for ceramic shaping according to claim 1, wherein an average particle diameter of the powder is between 5 μm and 100 μm.

10. The powder for ceramic shaping according to claim 4, wherein the powder contains:
   aluminum oxide; and
   gadolinium oxide or yttrium oxide.

11. The powder for ceramic shaping according to claim 7, wherein the organic compound contains the diimmonium compound.

\* \* \* \* \*